(12) United States Patent
Storey

(10) Patent No.: US 10,631,481 B2
(45) Date of Patent: Apr. 28, 2020

(54) MODULAR HYDROPONIC RACK SYSTEM FOR CROP CULTIVATION AND TRANSPORT

(71) Applicant: UNIVERSITY OF WYOMING, Laramie, WY (US)

(72) Inventor: Nathaniel R. Storey, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 219 days.

(21) Appl. No.: 15/308,090

(22) PCT Filed: May 11, 2015

(86) PCT No.: PCT/US2015/030170
§ 371 (c)(1),
(2) Date: Oct. 31, 2016

(87) PCT Pub. No.: WO2015/175415
PCT Pub. Date: Nov. 19, 2015

(65) Prior Publication Data
US 2017/0055474 A1  Mar. 2, 2017

Related U.S. Application Data

(60) Provisional application No. 62/000,138, filed on May 19, 2014, provisional application No. 61/991,593, filed on May 11, 2014.

(51) Int. Cl.
*A01G 31/06* (2006.01)
*A01G 31/02* (2006.01)
(Continued)

(52) U.S. Cl.
CPC .............. *A01G 31/06* (2013.01); *A01G 7/045* (2013.01); *A01G 25/023* (2013.01); *A01G 31/02* (2013.01); *Y02P 60/216* (2015.11)

(58) Field of Classification Search
CPC ....... A01G 31/06; A01G 7/045; A01G 25/023
See application file for complete search history.

(56) References Cited

U.S. PATENT DOCUMENTS 4,216,617 A * 8/1980 Schmidt ................. A01G 31/06
  47/62 A
4,594,811 A * 6/1986 Tokoro ................... A01G 31/06
  47/65

(Continued)

OTHER PUBLICATIONS

International Search Report, PCT/US15/30170, dated Aug. 12, 2015.
(Continued)

*Primary Examiner* — Michael H Wang
(74) *Attorney, Agent, or Firm* — Cochran Freund & Young LLC; James Weatherly

(57) ABSTRACT

A modular hydroponic cultivation and transport system for the cultivation and transport of organisms, including but not limited to, various forms of plants and fungi in hydroponic towers, is provided. Further, apparatuses for the cultivation and transport of organisms grown in hydroponic towers, are provided. Methods for the cultivation and transport of organisms using the transport system and apparatuses described herein are also provided herein.

44 Claims, 10 Drawing Sheets

(51) Int. Cl.
*A01G 7/04* (2006.01)
*A01G 25/02* (2006.01)

(56) References Cited

U.S. PATENT DOCUMENTS

| | | | | |
|---|---|---|---|---|
| 6,951,076 B2* | 10/2005 | Winsbury | ............... | A01G 31/02 47/59 R |
| 8,966,815 B1* | 3/2015 | Smiles | ................... | A01G 9/022 47/39 |
| 2001/0047617 A1* | 12/2001 | Blossom | ................ | A01G 31/02 47/62 R |
| 2003/0089037 A1* | 5/2003 | Ware | ....................... | A01G 31/02 47/83 |
| 2003/0101645 A1* | 6/2003 | Cole | ...................... | A01G 31/02 47/61 |
| 2006/0156624 A1* | 7/2006 | Roy | ....................... | A01G 31/02 47/62 R |
| 2009/0293350 A1* | 12/2009 | Kania | ..................... | A01G 9/023 47/29.1 |
| 2011/0016784 A1* | 1/2011 | Taber | ..................... | A01G 9/025 47/79 |
| 2012/0000128 A1* | 1/2012 | Rochefort | .............. | A01G 31/02 47/62 R |
| 2014/0000162 A1* | 1/2014 | Blank | .................... | A01G 31/06 47/62 A |
| 2014/0020292 A1* | 1/2014 | McNamara | ............... | A01G 9/16 47/66.6 |
| 2015/0264868 A1* | 9/2015 | Smiles | ..................... | A47F 3/00 47/59 R |
| 2015/0334930 A1* | 11/2015 | Stoltzfus | ................ | A01G 31/06 47/62 A |
| 2016/0066524 A1* | 3/2016 | Williams | ............... | A01G 31/06 47/62 R |

OTHER PUBLICATIONS

Horton, Robin, Vertical Farming on Rise for Urban Food Supply, Urban Gardens, Jul. 9, 2010.

* cited by examiner

MODULAR HYDROPONIC RACK SYSTEM FOR CROP CULTIVATION AND TRANSPORT

CROSS REFERENCE TO RELATED APPLICATIONS

This application claims the benefit of PCT Application No. PCT/US2015/30170, as filed May 11, 2015, which claims the benefit of priority to U.S. Provisional Application No. 61/991,593 filed May 11, 2014, and U.S. Provisional Application No. 62/000,138, filed May 19, 2014, the entire contents of the applications are incorporated herein by reference for all purposes.

BACKGROUND

Traditional hydroponics has focused primarily on permanent horizontal production techniques and has been subject to major space constraints. Vertical hydroponic applications have either been impractical, expensive to operate, or inefficient. Often these applications utilize some type of growth medium that is heavy when saturated, causing clogging when filled with plant roots, and/or requiring a great deal of maintenance.

SUMMARY

An embodiment of the present disclosure comprises a modular hydroponic rack transport system comprising: a mobile rack, where the mobile rack comprises: at least one riser; a means of support; at least one top brace, where the top brace is supported by the at least one riser; a base, where the base is operably coupled to and supports the at least one riser as well as a means for moving the rack; one or more hollow hydroponic towers; a slot formed in the front portion of each hydroponic tower; and a media material insertable into each hollow hydroponic tower; at least one upper bracket, where one or more upper bracket openings are formed in the bottom face of the upper bracket substantially corresponding to shape and width of the hydroponic towers; and at least one lower bracket, where one or more lower bracket openings are formed in the upper face of the lower bracket substantially corresponding to shape and width of the hydroponic towers and where the at least one lower bracket is supported on the rack by the means of support; where the first end of at least one of the hollow hydroponic towers is inserted into one of the bracket openings of the upper bracket; and where the second end of the hollow hydroponic tower is inserted into one of the lower bracket openings of the lower bracket; and a means of irrigation operably coupled to the mobile rack, where the means of irrigation transports water and nutrients to the first end of the one or more hollow hydroponic towers.

Another embodiment of the present disclosure may comprise a method for producing organisms on a hydroponic rack transport system, the method comprising: providing a mobile rack and a means for moving the mobile rack; providing one or more lower brackets, where one or more lower bracket openings are formed in the upper face of the lower brackets; providing a means for supporting the lower brackets on the mobile rack; where the one or more lower brackets are supported by the mobile rack by the means of support; providing one or more hollow hydroponic towers, where the shape and width of the one or more hydroponic towers substantially correspond to the opening formed in the lower brackets; providing a slot formed in the front face of each hydroponic tower; and providing a media material and inserting the media material into each hollow hydroponic tower; providing an upper bracket, where the one or more upper bracket openings are formed in the bottom face of the upper bracket substantially corresponding to shape and width of the openings of the one or more lower brackets; and inserting the first end of the one or more hollow hydroponic towers into the one or more upper bracket openings of the upper bracket; and inserting the second end of the hollow hydroponic tower into the one or more lower bracket openings of the lower bracket; providing a means of irrigation operably coupled to the mobile rack, where the means of irrigation transport water and nutrients to the first end of the hydroponic towers; inserting one or more organisms into the medial material in the hydroponic towers through the slot formed in each hydroponic tower; and growing one or more organisms on the media material.

An embodiment of the present disclosure comprises a mobile hydroponic rack comprising: at least one riser; at least one top brace, where the top brace is supported by the at least one riser; a means of support; a base, where the base is operably coupled to and supports the at least one riser; and a means for moving the rack; and one or more hollow hydroponic towers; a slot formed in the front portion of each hydroponic tower; and a media material insertable into each hollow hydroponic tower; at least one upper bracket, where one or more upper bracket openings are formed in the bottom face of the upper bracket substantially corresponding to shape and width of the one or more hydroponic towers; and at least one lower bracket supported by the means of support, where one or more lower bracket openings are formed in the bottom face of the lower bracket substantially corresponding to the shape and width of the one or more hydroponic towers; where the first end of at least one of the one or more hollow hydroponic towers is inserted into one of the one or more upper bracket openings of the upper bracket; where the second end of the hollow hydroponic tower is inserted into the one or more lower bracket openings of the lower bracket; and a means of irrigation operably coupled to the mobile rack, where the means of irrigation transports water and nutrients to the first end of the hydroponic towers.

The following embodiments and aspects thereof are described and illustrated in conjunction with systems, tools and methods, which are meant to be exemplary and illustrative, not limiting in scope.

BRIEF DESCRIPTION OF THE FIGURES

The accompanying figures, which are incorporated herein and form a part of the specification, illustrate some, but not the only or exclusive, example embodiments and/or features. It is intended that the embodiments and figures disclosed herein are to be considered illustrative rather than limiting.

DETAILED DESCRIPTION

Embodiments of the present disclosure include various apparatuses, systems and methods for the cultivation and transport of organisms, including but not limited to, various forms of plants and fungi in hydroponic towers modularly coupled in an array on a rack transport system, allowing individual hydroponic towers to be removed from or replaced on the rack transport system as necessary. The apparatuses and systems described herein allow for organisms such as plants grown in the hydroponic towers to be moved to different environments based upon the life cycle and health of the organism as well as to transport the organisms to market. The apparatuses and systems allow for an organism, such as a plant or fungi to be moved to and from a variety of structures including but not limited to greenhouses, warehouses, outbuildings as well as to be placed in a field. The modularity of the systems allows multiple rack systems to be reconfigured in different patterns within an area. The systems described herein allow plants and fungi to be moved directly from production to market, eliminating shipping and handling issues.

Figure 1:
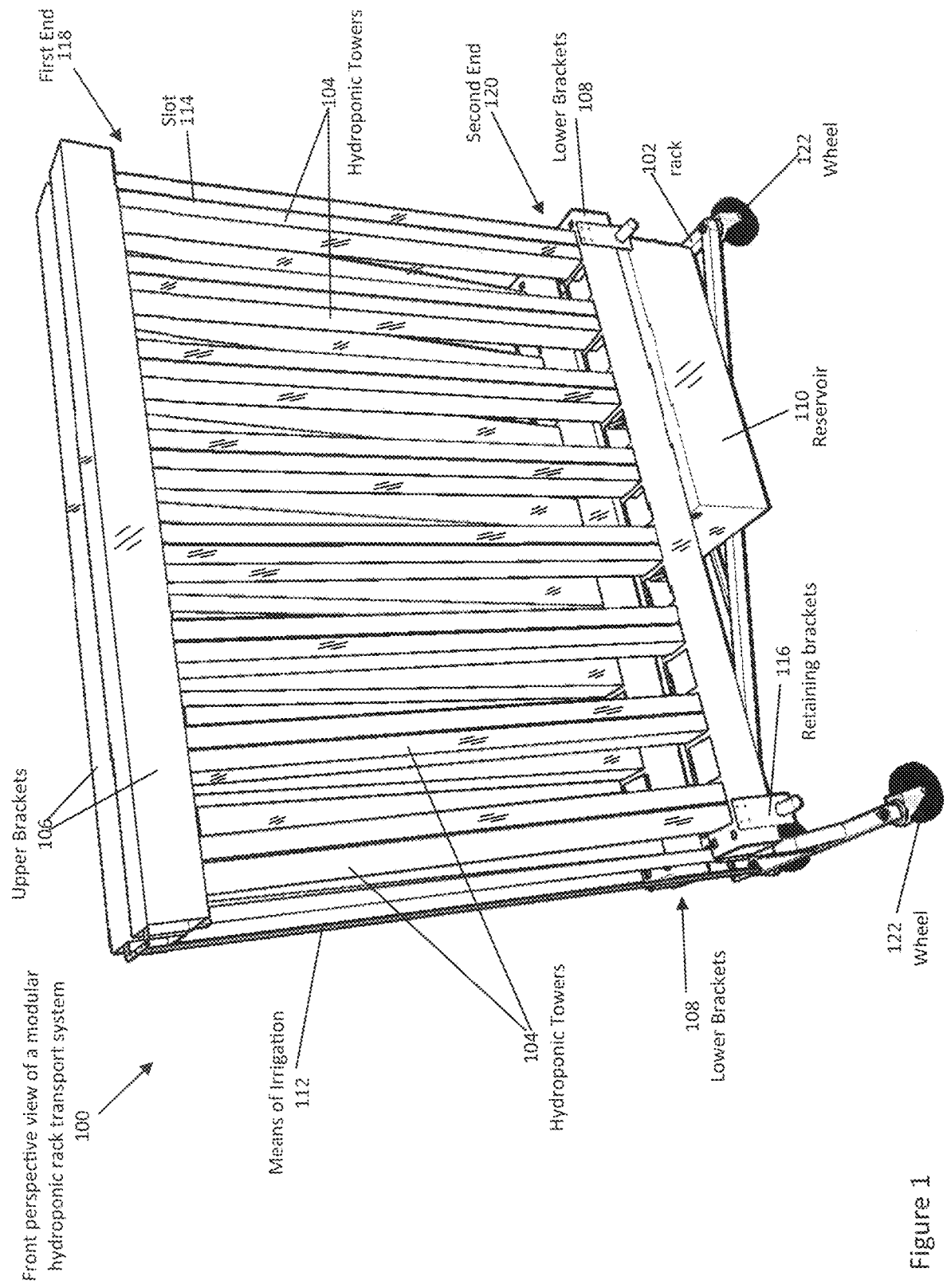
FIG. 1 is a perspective view illustrating an example of the modular hydroponic rack transport system.

FIG. 1 provides a perspective view of an example modular hydroponic rack transport system of the present disclosure 100. As shown in FIG. 1, the modular hydroponic rack transport system comprises at least one mobile rack 102, two or more hydroponic towers 104, at least one upper bracket 106; at least one lower bracket 108; a reservoir 110 and a means of irrigation 112 to transport water and nutrients from the reservoir 110 to the top of the two of more hydroponic towers 104.

As will be discussed in detail below in relation to FIG. 2, the mobile rack 102 is configured to support the two or more hydroponic towers 104, at least one upper bracket 106, at least one lower bracket 108; the reservoir 110 and the means of irrigation 112. The mobile rack 102 is designed to be completely self-sufficient and used individually or to be coupled to one or more additional mobile racks to create an array of mobile racks that can be arranged in various configurations.

Figure 4:
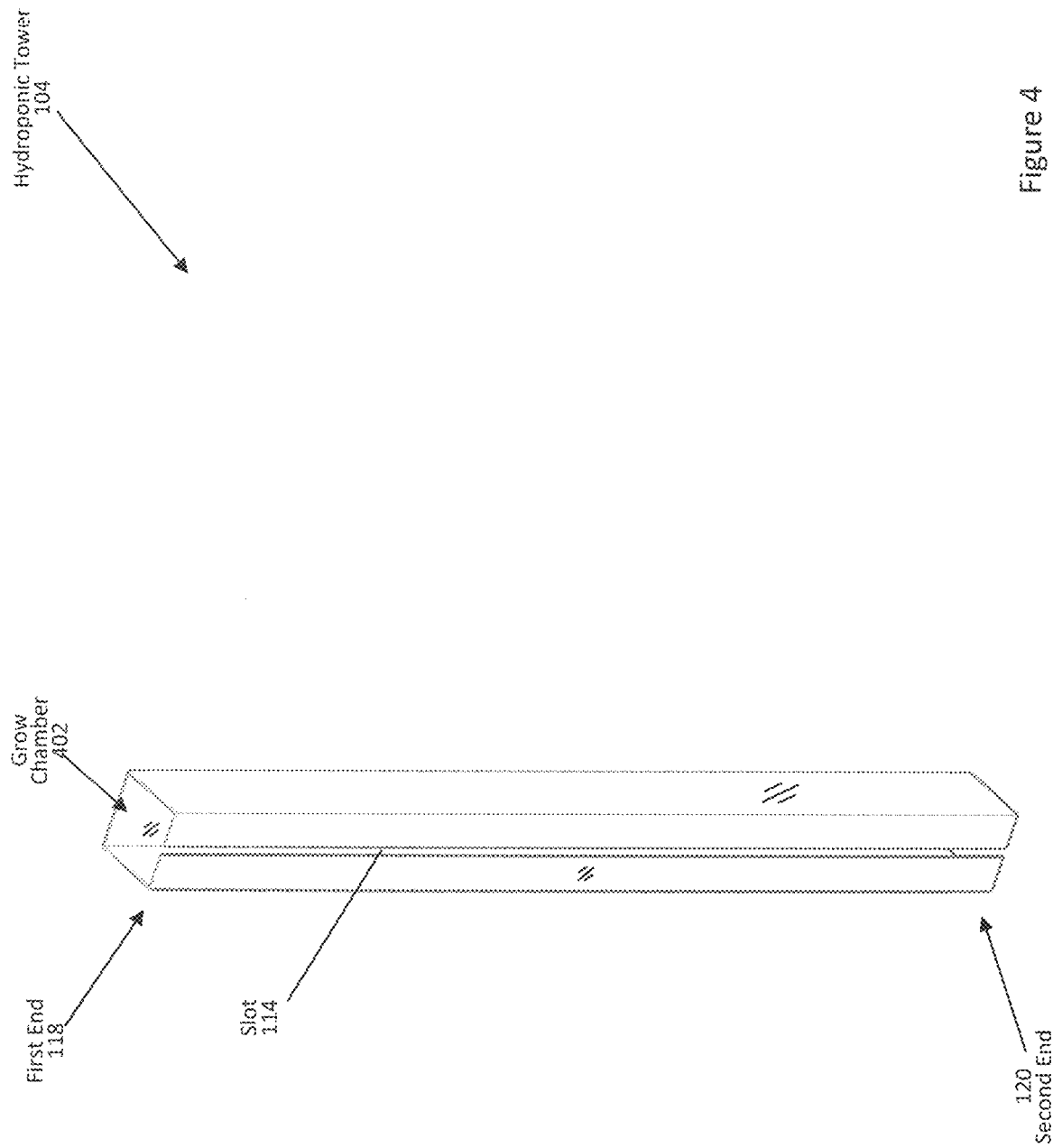
FIG. 4 is a perspective view illustrating an example hydroponic tower of the modular hydroponic rack transport system.

As shown in FIG. 1 and illustrated in further detail in FIG. 4, the hydroponic towers 104 are hollow, elongated structures with a slot 114 formed lengthwise from the first end 118 of the hydroponic tower 104 to the second end 120 the hydroponic tower 104 along the front face of the tower 104. In the example transport system 100 shown in FIG. 1, sixteen (16) hydroponic towers 104 are illustrated, but any number hydroponic towers 104 can be used. Therefore, while this descriptive example has sixteen hydroponic towers 104, it should be understood that this description is applicable to any such transport system with other numbers of hydroponic towers, as will be understood by one skilled in the art, once they understand the principles of this system.

As shown in FIG. 1, a reservoir 110 may be provided to store and capture excess water or solution that runs through the hydroponic towers 104 and through the lower bracket 108. The reservoir is operably coupled to the means of irrigation 112. The means of irrigation 112 is configured based on the number of hydroponic towers 104 integrated into the system 100. The means of irrigation 112 is designed to be quickly connected and disconnected to a main irrigation system or means of irrigations systems coupled to one or more additional mobile racks 102. In an additional embodiment, no reservoir is coupled to the mobile rack itself, but rather couplings may be integrated into the rack and operably coupled to the means of irrigation, allowing the rack to be connected and disconnected to a main irrigation and drainage system of a growing site. The means of irrigation 112 may include a pump (not shown in FIG. 1) operably coupled to a pipe, hose or other conduit and which is capable of delivering water and nutrient solutions to the hydroponic towers (such as but not limited to solutions containing nitrogen, phosphorus, potassium, iron, magnesium and zinc). The means of irrigation 112 allows water or nutrient solutions to be transported from the reservoir 110 to a first end 118 of the hydroponic towers 104 by running the means of irrigation 112, such as a pipe along the top of the hydroponic towers 104. As will be discussed in FIG. 9, the water or nutrient solution may be emitted from the means of irrigation 112 by a variety of emitters, including drip emitters, sprinklers and micro-spray emitters.

In an embodiment, a pump moves water and/or nutrient solution through the means of irrigation 112 from the reservoir 110 to the first end 118 of the hydroponic towers 104, distributing a nutrient solution into media material (not shown in FIG. 1) inserted in the grow chamber. The nutrient solution is allowed to drip down through the media and the roots of the plants or fungal material growing in the media. Some of the nutrient solution trickles down the walls of the hydroponic towers 104 and is captured by roots in contact with the walls of the towers 104. Excess nutrient solution drains to the bottom of the hollow grow chamber of the tower 104 where it is drained into the lower bracket 108 and drains into the reservoir 110.

As further shown in FIG. 1, an embodiment of the modular hydroponic rack transport system 100 consists of at least one upper bracket 106 and at least one lower bracket 108, where the lower brackets are supported by or operably coupled to the mobile rack 102 by a means of support such as retaining brackets 116. As will be discussed in further detail in relation to FIG. 5, the upper bracket 106 is a hollow, elongated structure with openings (not shown in FIG. 1) cut along lower face of the upper bracket 106, with the openings slightly larger than the cross sectional dimensions of the corresponding hydroponic tower 104, allowing the upper bracket 106 to slip over the top of each hydroponic tower 104.

As will be discussed in further detail in FIG. 6, the lower bracket 108 is also a hollow, elongated structure and comprises openings cut along upper face of the lower bracket 108, oppositely disposed to the openings of the upper bracket 106 when the two brackets are aligned. The lower bracket 108 functions as a gutter system, allowing effluent such as water and nutrient solutions to be collected and drained away.

In another embodiment, water or excess solution in the reservoir 110 may be pumped from the reservoir 110 to a storage tank (not shown in FIG. 1). The storage tank may hold/store the water/solution for use in the hydroponic tower array system 100.

A variety of means may be used for the moving the racks 102, as will be understood by a person skilled in the art. An example means for moving a hydroponic rack is shown in FIG. 1, where a plurality of wheels 122 are coupled to the base of a rack 102. In the case of FIG. 1, four (4) wheels 122 are provided, however any number of wheels may be used based on the shape and size of the rack.

Additional example means for moving the hydroponic rack may include an overhead conveyor operably coupled to the mobile rack, allowing the rack to move horizontally or vertically without touching the ground. An overhead pulley or trolley operably coupled to the rack may also be used, also allowing the rack to move horizontally or without touching the ground. In this embodiment, the mobile rack hangs from a trolley that rides on a rail system.

In another embodiment, the hydroponic racks may be a simple platform, which can be moved by forklift or placed on a rolling shelving system. This embodiment allows the elimination of row areas and allows racks/skids to be stacked during the entirety of the growing cycle and only pulled once the production cycle is complete.

In an additional embodiment, lights may be suspended from the center bar or hanger bar. This placement stimulates the plants grow towards the interior. $CO_2$, air, and nutrients may be introduced to the bottom interior of the rack and allowed to rise through the growing area to exit the top. Nutrient tanks can be introduced so that each rack becomes somewhat self-sufficient, allowing towers to be planted, the rack to be placed and only returned to once the plants are fully grown.

Covers that can be placed over the racks to allow them to be sealed off from the outside environment.

Figure 2:
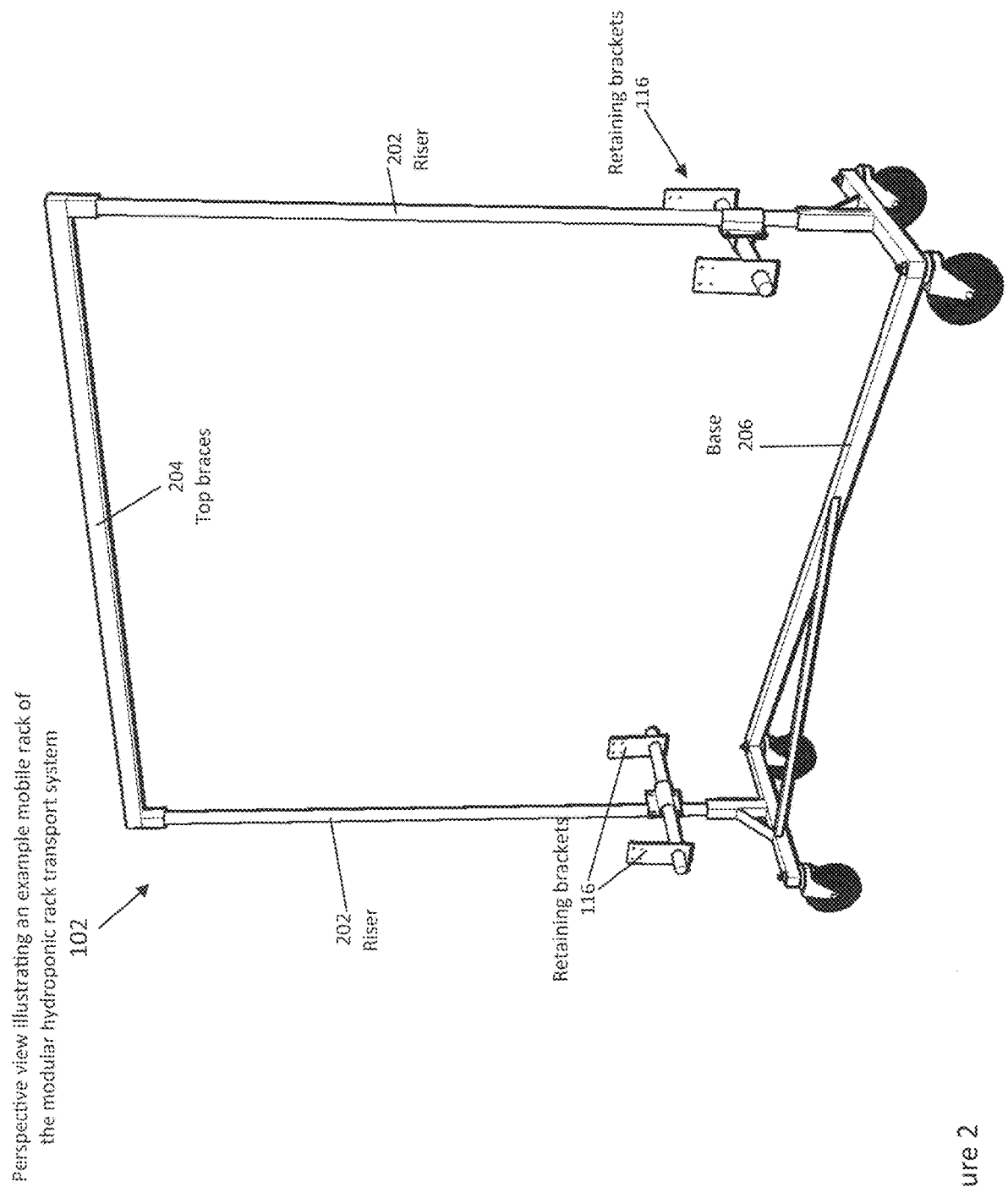
FIG. 2 is a perspective view illustrating an example mobile rack of the modular hydroponic rack transport system.

FIG. 2 provides a perspective view of an example mobile rack 102 of the system of the present disclosure. As shown in FIG. 2, the mobile rack comprises: one or more risers 202; a top brace 204 or hanger bar, where the top brace 204 is supported by the risers 202; a base 206 and one or more retaining brackets 116 operably coupled to each riser 202, where the base 206 is operably coupled to and supports the each riser 202 by means of a coupling device. The mobile rack 102 may be may be made of metal such as aluminum or steel as well as, fiberglass, plastic or wood. As will be understood by one skilled in the art, a variety of shapes may be used for the base 206, including H and Z formations, depending on the size and shape of the rack 102. In the example rack 102 shown in FIG. 2, two (2) retaining brackets 116 are illustrated but any number of pairs of retaining brackets 116 can be placed vertically on the riser 202, allowing for multiple arrays of hydroponic towers to be assembled on one rack. Therefore, while this descriptive example has two retaining brackets 116, it should be understood that this description is applicable to any such transport system with other numbers of retaining brackets, as will be understood by one skilled in the art, once they understand the principles of this system.

Figure 3:
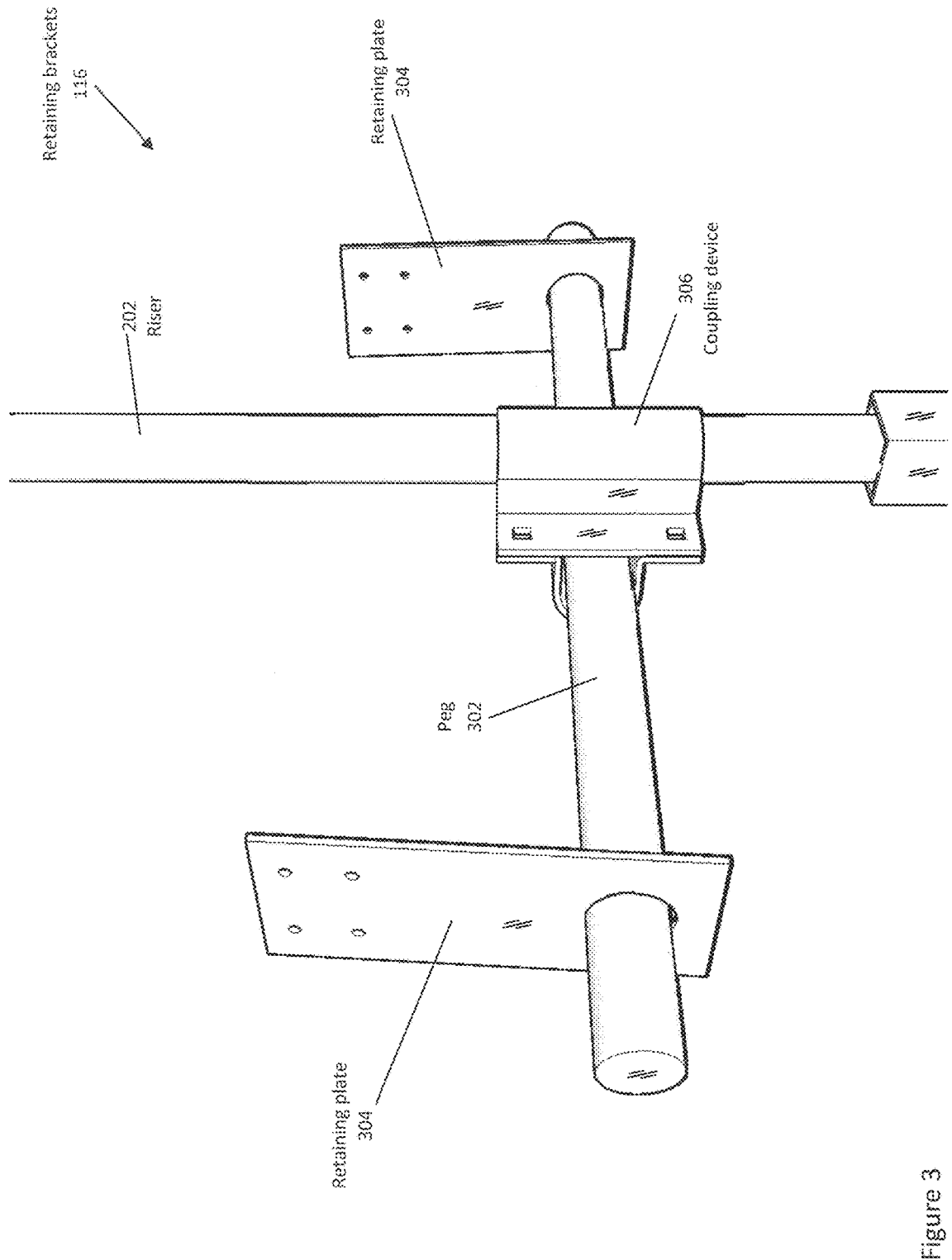
FIG. 3 is a close-up view illustrating an example of the retaining bracket of the modular hydroponic rack transport system.

FIG. 3 provides a close-up view of the retaining brackets 116 of the rack transport system 100. As shown in FIG. 3, the retaining brackets 116 comprise a rod or peg 302 and a retaining plate 304 where the rod or peg 302 is operably coupled to the risers 202 by means of a coupling device 306. The rod or peg 302 of the retaining bracket 116 provides a platform for the bottom brackets (not shown in FIG. 3) to rest while the plate 304 of the retaining brackets 116 holds the bottom bracket in place. As will be understood by one skilled in the art, the retaining brackets 116 may be made of a variety of durable materials, including but not limited to, metal such as aluminum or steel as well as, fiberglass, plastic or wood.

In another embodiment, the metal plate of FIG. 3 is not used. Instead, the peg, 302 is pushed through corresponding holes in the sides (near the top of the bracket) of the lower bracket (not shown in FIG. 3). In this embodiment, the top bracket may then be mounted the same way, sliding over a peg mounted to the riser at the top of the rack (not shown in FIG. 3).

FIG. 4 provides a perspective view of a hydroponic tower 104 of the present disclosure. As shown in FIG. 4, the hydroponic tower 104 is comprised of a front face, a rear face, and a right side and left side, with an open first end 118 and an open second end 120. The hollow shape of the hydroponic tower 104 creates a grow chamber 402 in the cavity of the hydroponic tower 104 where media material is inserted to provide a stable surface/platform on which an organism such as a plant or fungi is able to establish roots or rhizomes and grow. Each tower 104 maybe may be constructed of a variety of materials including but not limited to metals including titanium, steel, stainless steel, aluminum, and aircraft aluminum, synthetic polymers such as nylon, plastics, such as high-density polyethylene 'HDPE', or composite materials, such as carbon-fiber-reinforced polymers, carbon-fiber-reinforced plastics and carbon-fiber reinforced thermoplastics. While the shape of the elongated hydroponic towers 104 shown in FIG. 1 and FIG. 4 are substantially square, as will be understood by one skilled in the art, a variety of shapes may be used to create the hydroponic towers and growth chambers described herein, including but not limited to substantially square, rectangular, round, oval, octagon, pentagon and triangular.

As further shown in FIG. 4, the hydroponic tower 104 has a slot 114 formed lengthwise along the front face of the tower 104. The slot 114 also allows for the easy insertion of organisms such as plants and fungi into the media along the length of the structure and to grow out of media that is inserted into the growth chamber 402. A variety of slots may be used in the hydroponic towers provided herein, an example width of the slot is equal to between $\frac{1}{12}$ and $\frac{1}{4}$ the width of the front face of the hydroponic tower.

The media material of the present disclosure maybe be a single piece of media composed of a variety of materials including plastic, such a polyester matrix material cut to a diameter that allows for easy insertion of the material into the grow chamber 402 of each hydroponic tower 104. In another embodiment, the media material may be coated in a silicone binder. In one embodiment, the single piece of media material may be cut into strips the width of the diameter of the grow chamber 402. The individual strips of media material may then be folded and pulled into this grow chamber 402 at the top of the grow chamber 402 of each hydroponic tower 104, with seedlings or fungi sandwiched in the fold between the two halves of the media material and corresponding to the location of the slot 114 running the length of the face of the hydroponic towers 104. As the media is pulled into the grow chamber 402, more seedlings are added, and as the media enters the grow chamber 402, the shoots of the seedlings extend out horizontally and travel down this slot 114. Multiple media inserts may be added to the grow chamber 402, until the media encompasses the entire length of the grow chamber 402.

The media material of the present disclosure may be altered in several ways to serve a diverse range of functions. The media may be cut at a taper from the unfastened or unfolded end to the fastened or folded end, reserving a tapered space at the rear of the insert to allow compost, alternate plant media, fertilizing substance or some type of soil amendment or additive to be held in the space between the tapered media insert and the rear and sidewalls of the grow chamber 402. This alteration allows compost based hydroponic growth using regular irrigation water, with plant nutrients supplied by the compost or other additive. Tops, sides, and corners of the media material can also be cut, rounded, or cut at an angle to reduce biosolids accumulation, algal growth, or to enhance water distribution through the media, depending on application. Multiple inserts can also be used in the grow chambers 402 allowing multiple age groups of plants and fungi to incorporate into each grow chamber 402. Worms are also commonly integrated into the grow chambers and the media is designed to have the correct mesh size to accommodate their movement through the media, although media with a smaller or larger mesh size may be used depending on application.

For planting, seedlings or fungal tissue are placed between the two halves of media in each grow chamber 402 of the system, with the upper portions of the plant or organism protruding through the slot 114 of each hydroponic tower 104.

In a further embodiment, once the media material is folded in half, a pulling hook with a flat hook attached to a handle allows the media inserts to be pulled into and out of the grow chamber 402 by means of the slot 114, with the pulling hook handle extending from the slot 114 in the grow chamber 402 of each hydroponic tower 104. In a further embodiment, the hook can also be attached to a pneumatic or hydraulic device that allows automated "pulling" of the media inserts.

Figure 5:
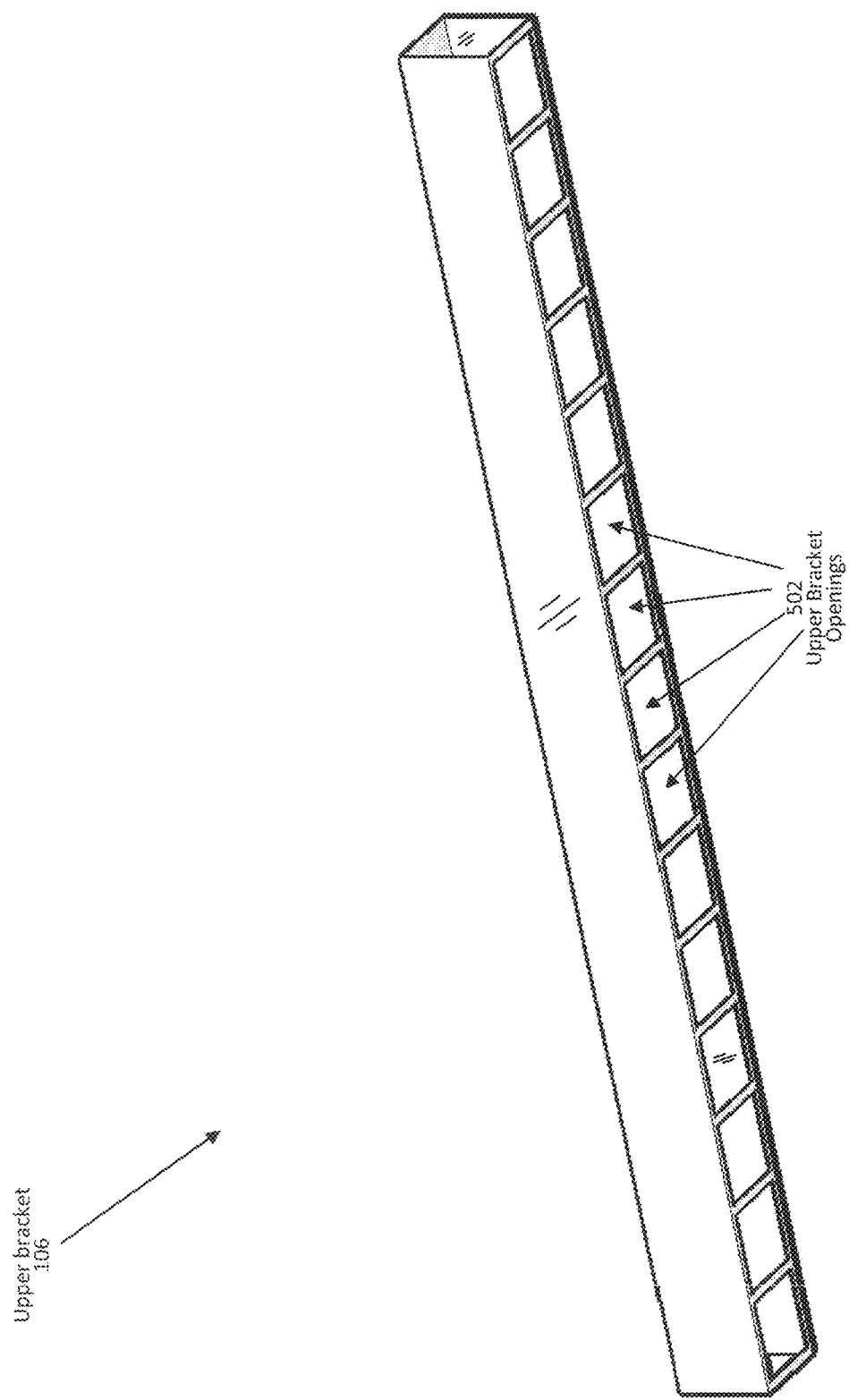
FIG. 5 is a perspective view illustrating an example of the upper bracket of the modular hydroponic rack transport system.

FIG. 5 provides a perspective view of the upper bracket 106 as isolated from the hydroponic tower array system. As previously discussed in relation to FIG. 1 and shown in FIG. 5, the upper bracket 106 is an elongated hollow structure having upper bracket openings 502 cut along the lower face of the upper bracket 106, of the same shape and slightly larger than the cross section dimensions of the hydroponic towers 104. While the shape of the upper brackets 106 shown in FIG. 1 and FIG. 5 are substantially square, as will be understood by one skilled in the art, a variety of shapes may be used, including but not limited to substantially square, rectangular, round, oval, octagon, pentagon and triangular. Each upper bracket 106 maybe may be constructed of a variety of materials including but not limited to, metals including titanium, steel, stainless steel, aluminum, and aircraft aluminum, synthetic polymers such as nylon, plastics, such as high-density polyethylene 'HDPE', or composite materials, such as carbon-fiber-reinforced polymers, carbon-fiber-reinforced plastics and carbon-fiber reinforced thermoplastics.

Figure 6:
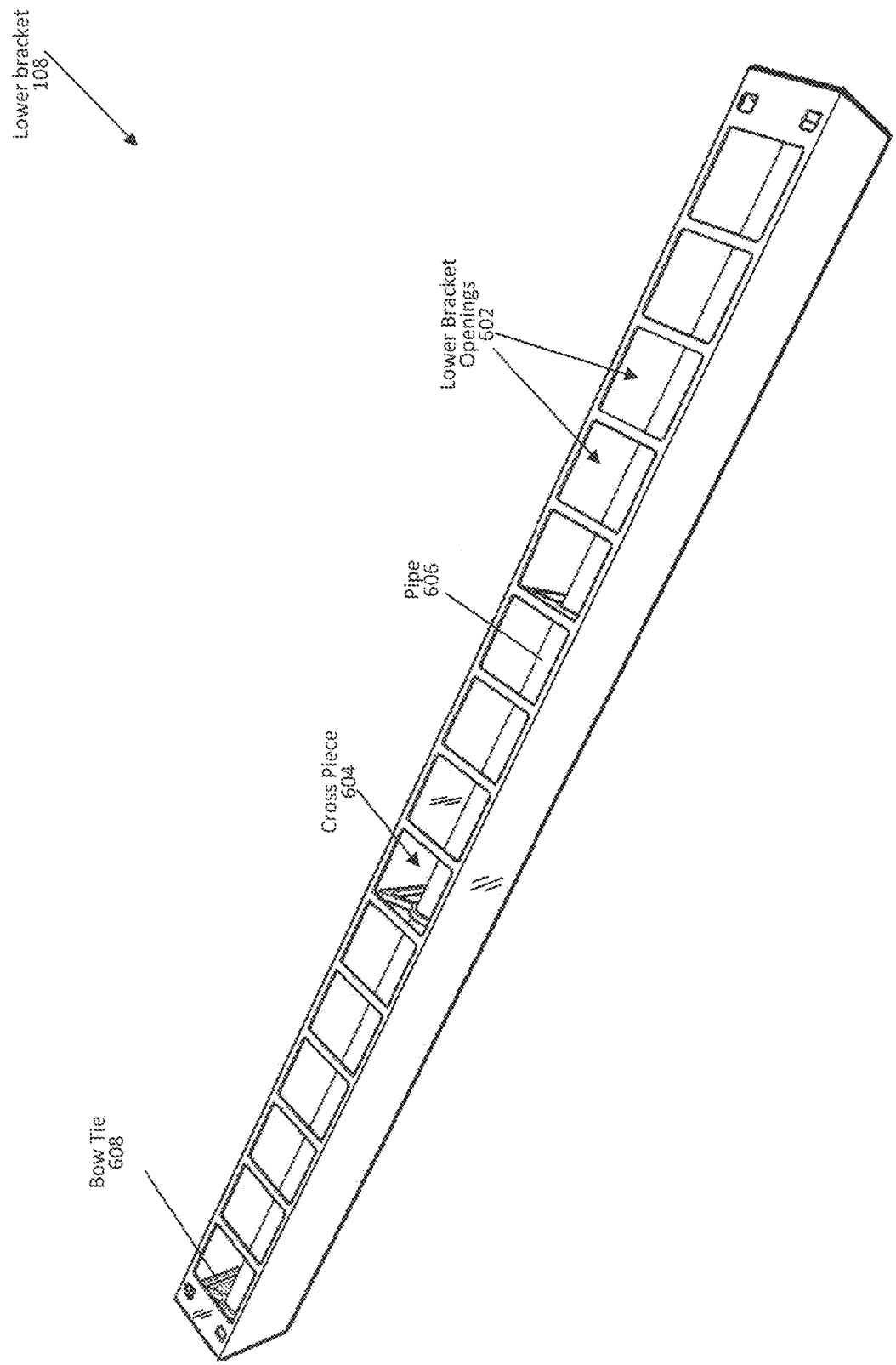
FIG. 6 is a perspective view illustrating an example of the lower bracket of the modular hydroponic rack transport system.

FIG. 6 provides a perspective view of the lower bracket 108 of the hydroponic array system. As shown in FIG. 6, the lower bracket 108 is an elongated hollow structure with lower bracket openings 602 cut along the upper face of the lower bracket 108, of the same shape and slightly larger than the cross section dimensions of the hydroponic tower 104. Inside the lower bracket 108 is placed a cross piece 604 that runs down the length of the lower bracket 108. As with the upper brackets, while the shape of the lower brackets 108 shown in FIG. 1 and FIG. 6 are substantially square, as will be understood by one skilled in the art, a variety of shapes may be used, including but not limited to substantially square, rectangular, round, oval, octagon, pentagon and triangular. Each lower bracket 108 maybe may be constructed of a variety of materials, including but not limited to, metals including titanium, steel, stainless steel, aluminum, and aircraft aluminum, synthetic polymers such as nylon, plastics, such as high-density polyethylene 'HDPE', or composite materials, such as carbon-fiber-reinforced polymers, carbon-fiber-reinforced plastics and carbon-fiber reinforced thermoplastics.

Figure 7:
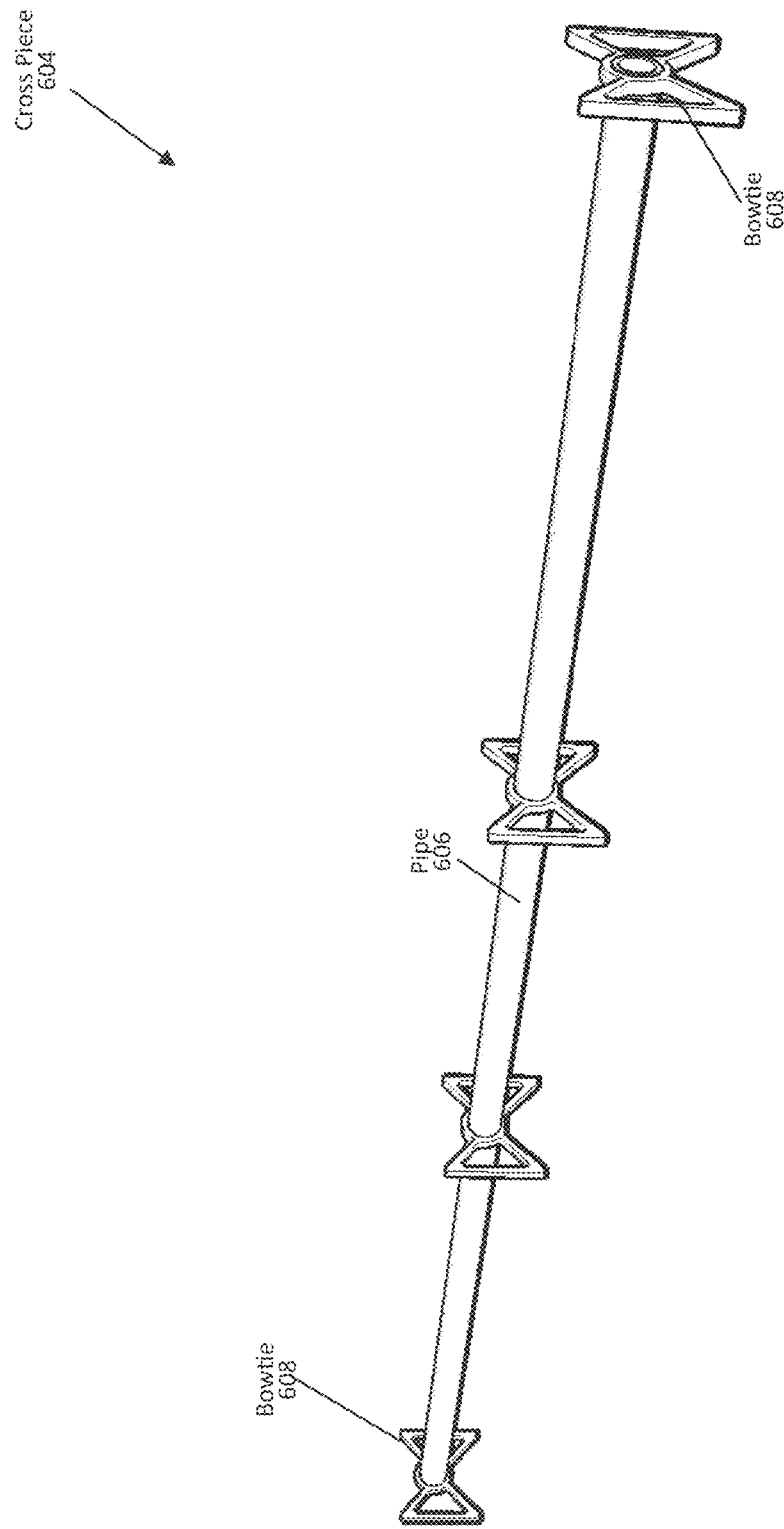
FIG. 7 is a perspective view illustrating an example of the cross piece isolated from lower bracket of the modular hydroponic rack transport system.

FIG. 7 provides a perspective view of the cross piece 604, isolated from the lower bracket 108. As shown in FIG. 7, the cross piece 604 typically consists of a section of pipe 606 substantially equal in length to the lower bracket (not shown in FIG. 7). The pipe 606 is inserted through support pieces, shown as the bowties 608 of this example, that hold the pipe 606 up off the bottom of the lower bracket 108 at a specific height, where an example elevated height may be three inches. The cross piece 604 may be made of metal such as aluminum or steel as well as plastics, such as high density polyethylene 'HDPE', or composite materials, such as carbon-fiber-reinforced polymers, carbon-fiber-reinforced plastics and carbon-fiber reinforced thermoplastics, and allows each hydroponic tower (not shown in FIG. 7) to rest on the pipe 606 and be held securely on the cross piece 604, when the hydroponic tower 104 is inserted into a corresponding lower bracket opening 602 in the lower bracket 108. This allows each hydroponic tower 104 to remain elevated above the bottom of the lower bracket 108, allowing water and nutrients to easily drain out of each hydroponic tower 104 and into the lower bracket 108 where the water or nutrient solution is able to travel and drain into the reservoir (not shown in FIG. 7).

Figure 8:
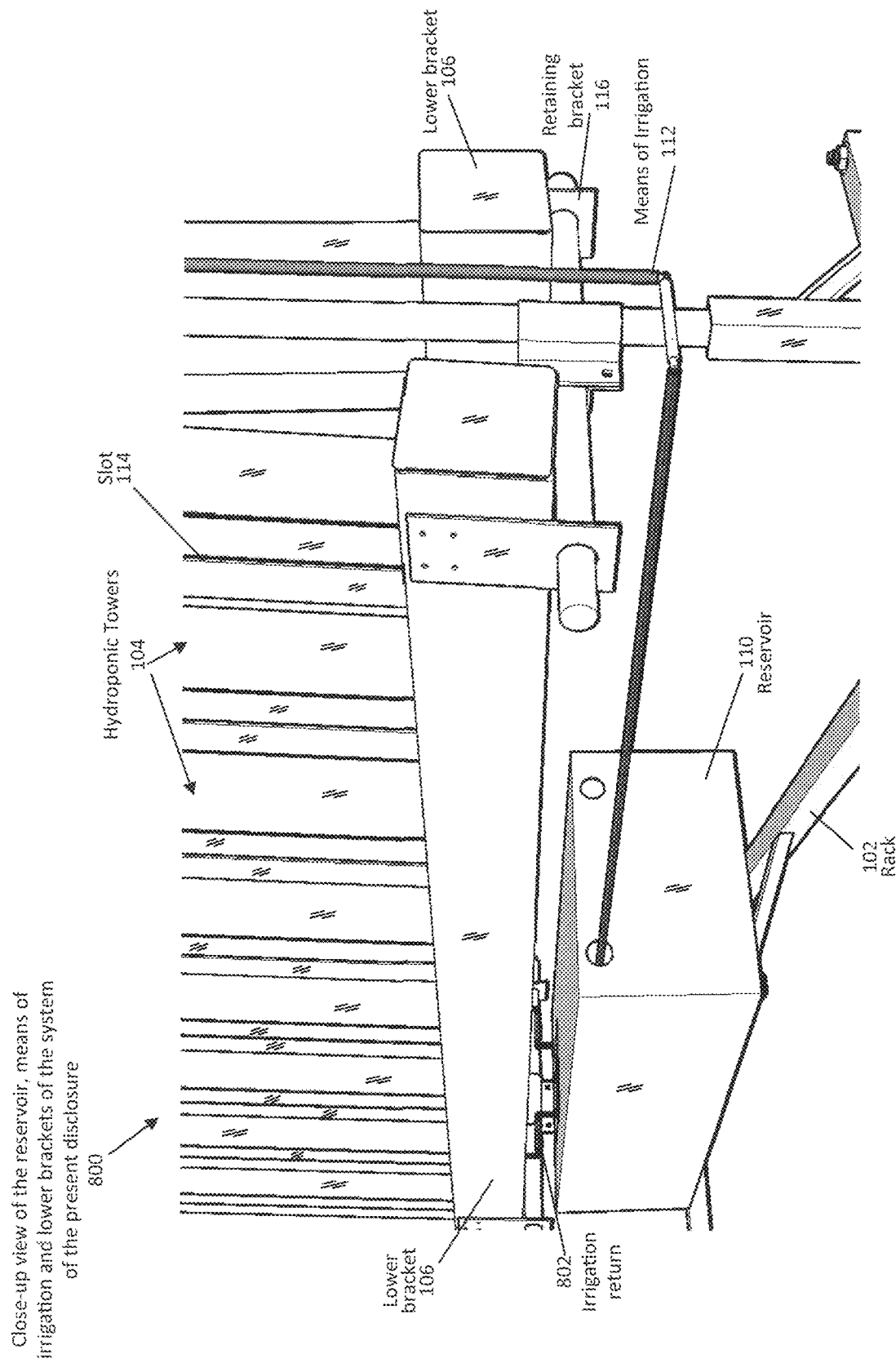
FIG. 8 is a close-up view of the reservoir, means of irrigation and lower brackets of the system of the present disclosure.

FIG. 8 shows a close-up view of the reservoir 110, means of irrigation 112 and lower brackets 108 supported by the rack 102 of the system of the present disclosure. As shown in FIG. 8, the reservoir 110 is supported by the rack 102 and is operably coupled to the base of the rack 102. The reservoir 110 may include a pump (not shown in FIG. 8) which is situated in the bottom of the reservoir 110 and serves to move liquids from the reservoir to the means of irrigation 112. Liquid and nutrients are pumped through the means of irrigation 112 to the first end of the hydroponic towers 104, where as described above, the liquid is emitted into the growth chamber of the hydroponic towers and allowed to trickle down through the growth media in the hydroponic tower where the plant roots or mycelia of the fungi uptake the nutrients, remaining nutrients flow out of the hydroponic towers 104 and into the lower bracket 108. In the lower bracket 108, the remaining nutrients flow to the irrigation return 802, where the nutrient flow back in to the reservoir 110. Once returned to the reservoir 110, the nutrients are available to be pumped back into the means of irrigation 112 and sent to the hydroponic towers 104.

Figure 9:
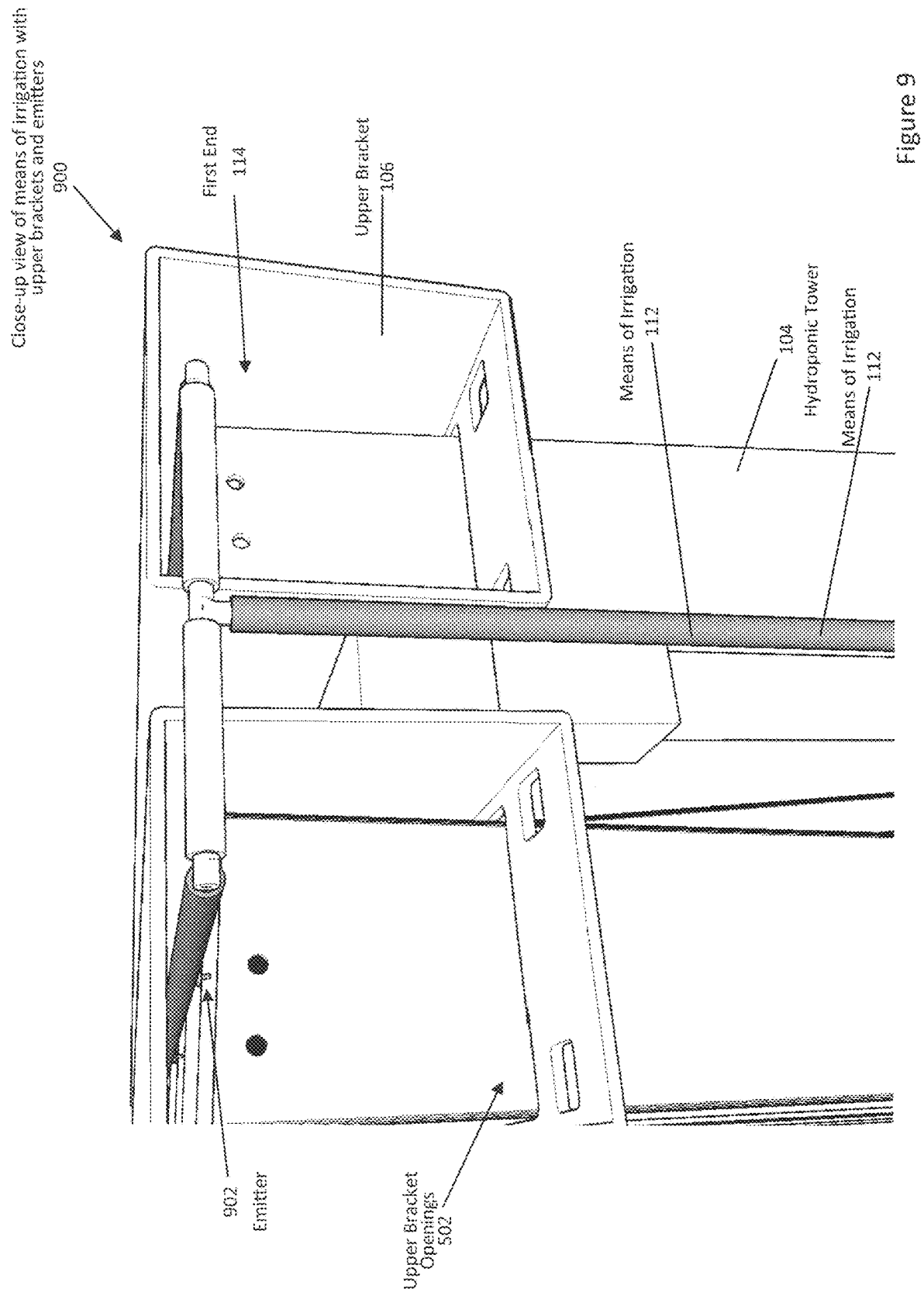
FIG. 9 is a close-up view of means of irrigation with upper brackets and emitters.

FIG. 9 provides a close-up view illustrating an example of the upper brackets 106 in association with a means of irrigation, 900. As shown in FIG. 9, a means of irrigation 112, is run from the reservoir to the top of the first end 118 of the hydroponic towers 104. The means of irrigation 112 may be operably coupled to the upper bracket 106 allowing the means of irrigation 112 to remain elevated above the first end 118 of the hydroponic towers 104. Water or nutrients are pumped through the means of irrigation 112 from the reservoir to the top of the hydroponic towers 104. The water or nutrient solution may then be emitted from the means of irrigation 112 by a variety of emitters 902, including drip emitters, sprinklers and micro-spray emitters through the upper bracket openings 502 in the bottom of the upper bracket 106 into media material inserted in the grow chamber. The water and nutrient solution is then allowed to drip down through the media and the roots of the plants growing in the media.

As shown in FIG. 9, the means of irrigation 112 of the system, can be easily hidden in the upper bracket 106 by attaching irrigation lines to the top of the upper bracket 106, with emitters allowing water to drip down onto the tops of the inserted towers 104.

In an embodiment of the present disclosure, the lower bracket is placed onto the retaining brackets of the rack, where the retaining brackets support the lower bracket. Each hydroponic tower is then inserted into the system by inserting the second end of the first hydroponic tower into the opening in the bottom bracket. The upper bracket is then placed over the first end of each hydroponic tower through the upper bracket openings. The upper bracket may then be operably coupled to or supported by the top brace or hanger of the rack. The means of irrigation is then operably coupled to the reservoir and operably coupled to the first end of the hydronic towers through the upper bracket.

To remove an individual hydroponic tower from the rack, the means of irrigation is uncoupled and removed from the upper bracket. The upper bracket is uncoupled or removed from the top brace of the rack. The upper bracket is then lifted vertically off the first end of the hydroponic tower 104. The hydroponic tower is then lifted vertically until the second end is clear of the lower bracket. In this way, individual hydroponic towers can be quickly and easily placed in the modular hydroponic rack system and removed from the system.

Figure 10:
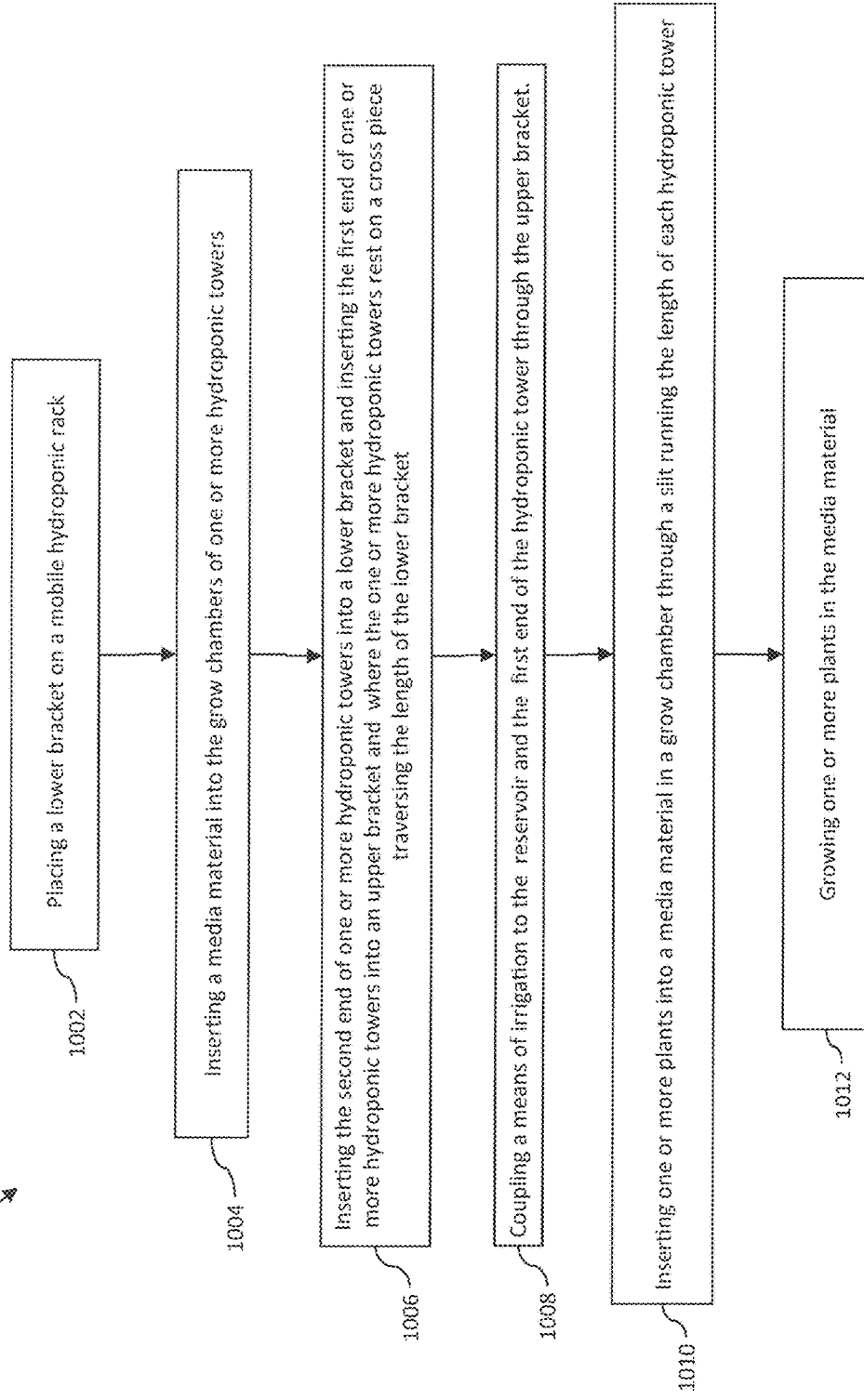
FIG. 10 provides a flow diagram for producing organisms in a modular hydroponic rack transport system.

FIG. 10 provides a flow diagram for producing organisms in a modular hydroponic rack transport system 1000. In step 1002, a mobile hydroponic rack is provided where the rack base supports a reservoir. A lower bracket is placed on the mobile hydroponic rack and supported by the retaining brackets operably coupled to the mobile rack. In step 1004, a single piece or strips of media material is placed or inserted into the hollow grow chamber of a hydroponic tower, where the hydroponic tower is comprised of a front face with a slot running the length of the front face, with an open first end and an open second end. Each hydroponic tower rests and is secured on top of a cross piece internally running the length of the lower bracket. In step 1006, the open second end of the hydroponic tower is inserted into the lower bracket through openings in the upper face of the lower bracket, substantially corresponding to the diameter and shape of each hydroponic tower. An upper bracket is placed over the first end of the hydroponic tower, where the hydroponic tower slides through openings in the bottom face of the upper bracket. In step 1008, a first end of the means of irrigation is operably coupled to the reservoir and the second end of the means of irrigation is operably coupled to the first end of the hydroponic tower through the upper bracket. In step 1010, one or more plants or fungi are inserted into the media material, through the slot running the length of the front face of each hydroponic tower. Water and nutrients may be pumped to the top of each hydroponic tower and emitted into the media material and allowed to drip down through the media where the plants may update the nutrients as needed. Any remaining nutrients may then be collected in the lower bracket and then drained into a reservoir located at the base of the mobile hydroponic tower transport system, where the nutrients may then be recycled back to the plants or fungi. In step 1012, the plants or fungi in the media material are then grown and may be harvested as desired. The plants or fungi may be harvested in the hydroponic towers in situ, or the hydroponic towers may be removed from the mobile rack and transported to a location where the plants may be harvested or further cultivated as needed.

All the embodiments of the system self-contained with the mobile rack, allowing plants or fungi growing in each hydroponic tower to be moved from location to location without the need to remove water or nutrients from the system. The mobile hydroponic rack system offers the ability for users to quickly remove a single hydroponic tower from the system as needed, such as removing mature plants for harvesting or removing dead plants while also allowing the user to quickly and easily identify, isolate and remove pests or disease from the system without damaging other plants located in other hydroponic towers The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A modular hydroponic rack transport system comprising:
   a mobile rack, wherein said mobile rack comprises:
      at least one riser;
      at least one top brace, wherein said top brace is supported by said at least one riser;
      a base, wherein said base is operably coupled to and supports said at least one riser;
      at least one means of support; and
      a means for moving said rack;
   two or more hollow hydroponic towers;
   a slot formed in the front portion of each hydroponic tower, wherein said slot is formed continuously along the length of said front portion of each hydroponic tower; and
   a media material insertable into each hollow hydroponic tower;
   at least one hollow upper bracket, wherein said hollow upper bracket has an interior and an exterior separated by a top face, a bottom face, a left side, and a right side, wherein at least two upper bracket openings are formed in the bottom face of the upper bracket, wherein each said upper bracket openings substantially correspond to the shape and width of each of the two or more hydroponic towers; and
   at least one hollow lower bracket, wherein said hollow lower bracket has an interior and an exterior separated by a top face, a bottom face, a left side, and a right side, wherein at least two lower bracket openings are formed in the top face of the lower bracket, wherein each lower bracket said opening substantially correspond to the shape and width of the two or more hydroponic towers, wherein said at least one lower bracket is supported by said means of support;
   a means of elevation provided within the at least one lower bracket, wherein said means of elevation elevates said hydroponic tower from the lower face of the lower bracket;

wherein the first end of at least two of the two or more hollow hydroponic towers are inserted into two of the at least two upper bracket openings of the upper bracket;

wherein the second end of each of the two or more hollow hydroponic towers are inserted into each of the at least two lower bracket openings of the lower bracket;

wherein said hollow hydroponic tower allows organisms to be inserted into said media material through said slot, allowing said organisms to grow out of said media material and through said slot; and a means of irrigation operably coupled to said mobile rack, wherein said means of irrigation transports water and nutrients to the two or more hydroponic towers.

2. The system of claim 1, further comprising a reservoir, wherein said reservoir is operably coupled to said base; and
wherein said means of irrigation transports water and nutrients from the reservoir to the two or more hydroponic towers.

3. The system of claim 2, wherein said means of irrigation comprises:
at least one pump;
a conduit capable of transporting water or liquid nutrients from said reservoir,
wherein said conduit is operably coupled to said at least one pump; and
at least one emitter;
wherein said pump transports water or liquid nutrients from said reservoir through the conduit and delivered to said media material through said at least one emitter.

4. The system of claim 1:
wherein said hollow hydroponic towers have a front face, a back face, an open first end, and an open second end; and
the slot having a width equal to only a portion of a width of the front face.

5. The system of claim 1, wherein said means of elevation is a cross piece, wherein said cross piece traverses the interior chamber of the lower bracket.

6. The system of claim 1, wherein said means of support is two or more retaining brackets.

7. The system of claim 1, wherein said means for moving said rack comprises a plurality of wheels operably coupled to said base, such that said wheels enable said rack to move on a ground surface.

8. The system of claim 1, wherein said means for moving said rack comprises at least one overhead conveyor operably coupled to said rack, such that said at least one overhead conveyor enables said rack to move horizontally without touching the ground.

9. The system of claim 1, wherein said means for moving said rack comprises at least one overhead pulley operably coupled to said rack, such that said at least one overhead pulley enables said rack to move horizontally without touching the ground.

10. The system of claim 1, wherein said media material is made of plastic.

11. The system of claim 10, wherein said media material is made from a polyethylene plastic.

12. The system of claim 11, wherein said media material is coated in a silicone binder.

13. The system of claim 1, wherein said organisms are selected from plants and fungi.

14. The system of claim 1, wherein said emitter is selected from a drip emitter, sprinkler and micro-spray emitters.

15. The system of claim 1, further comprising at least one light emitting device, operably coupled to the top brace.

16. A method for producing organisms on a hydroponic rack transport system, the method comprising:
providing a mobile rack;
providing a means for moving said rack;
providing one or more hollow lower brackets, wherein said hollow lower bracket has an interior and an exterior separated by a top face, a bottom face, a left side, and a right side, wherein at least two lower bracket openings are formed in the top face of the one or more lower brackets;
providing a means of support, wherein said means of support is operably coupled to said rack and wherein said one or more lower brackets are supported on said mobile rack by said means of support;
providing two or more hollow hydroponic towers, wherein the shape and width of the two or more hydroponic towers substantially correspond to the openings formed in the lower brackets;
providing a slot formed in the front face of each hydroponic tower, the slot having a width equal to only a portion of a width of the front face, and wherein said slot is formed continuously along the entire length of each tower; and
providing a media material;
inserting said media material into each hollow hydroponic tower;
inserting the second end of at least two of the hollow hydroponic towers into at least two of the at least two lower bracket openings of the lower bracket;
providing a hollow upper bracket, wherein said hollow upper bracket has an interior and an exterior separated by a top face, a bottom face, a left side, and a right side, wherein at least two upper bracket openings are formed in the bottom face of the upper bracket substantially corresponding to the shape and width of the openings of the one or more lower brackets;
providing a means of elevation provided within the at least one lower bracket; and
inserting the first end of each of the at least two or more hollow hydroponic towers into each of the at least two upper bracket openings of the upper bracket; and
providing a means of irrigation operably coupled to said mobile rack, wherein said means of irrigation transport water and nutrients to the hydroponic towers;
inserting one or more organisms into the media material through the slot formed in the front face of each hydroponic tower; and
growing one or more organisms on said media material.

17. The method of claim 16, further comprising:
providing a reservoir, wherein said means of irrigation transport water and nutrients from the reservoir to the hydroponic towers.

18. The method of claim 17, wherein said means of irrigation comprises:
providing at least one pump;
providing a conduit capable of transporting water or liquid nutrients from said reservoir, wherein said conduit is operably coupled to said at least one pump; and
providing at least one emitter;
wherein said pump transports water or liquid nutrients from said reservoir through the conduit and delivered to said media material through said at least one emitter.

19. The method of claim 16, wherein said means of elevation is a cross piece, wherein the cross piece traverses the interior chamber of the lower bracket and wherein said cross piece elevates said hydroponic towers from the lower surface of the lower bracket.

20. The method of claim 16, wherein said means of support is two or more retaining brackets.

21. The method of claim 16, wherein said means for moving said rack comprises a plurality of wheels operably coupled to said base, such that said wheels enable said rack to move on a ground surface.

22. The method of claim 16, wherein said means for moving said rack comprises at least one overhead conveyor operably coupled to said rack, such that said at least one overhead conveyor enables said rack to move horizontally without touching the ground.

23. The system of claim 16, wherein said means for moving said rack comprises at least one overhead pulley operably coupled to said rack, such that said at least one overhead pulley enables said rack to move horizontally without touching the ground.

24. The method of claim 16, wherein said media material is made of plastic.

25. The method of claim 24, wherein said media material is made from a polyethylene plastic.

26. The method of claim 25, wherein said media material is coated in a silicone binder.

27. The method of claim 16, wherein said organisms are selected from plants and fungi.

28. The method of claim 16, wherein said emitter is selected from a drip emitter, sprinkler and micro-spray emitters.

29. The method of claim 16, further comprising providing at least one light emitting device, where said at least one light emitting device is operably coupled to the top brace.

30. A mobile hydroponic rack comprising:
at least one riser;
at least one top brace, wherein said top brace is supported by said at least one riser;
at least one lower bracket support;
a base, wherein said base is operably coupled to and supports said at least one riser; and
a means for moving said rack; and
two or more hollow hydroponic towers;
a slot formed in the front portion of each hydroponic tower; wherein said slot is continuously formed along the entire length of each tower; and
a media material insertable into each hollow hydroponic tower;
at least one hollow upper bracket, wherein said hollow upper bracket has an interior and an exterior separated by a top face, a bottom face, a left side, and a right side; wherein at least two upper bracket openings are formed in the bottom face of the upper bracket substantially corresponding to the shape and width of each of the two or more hydroponic towers; and
at least one hollow lower bracket, wherein said hollow lower bracket has an interior and an exterior separated by a top face, a bottom face, a left side, and a right side; wherein at least two lower bracket openings are formed in the top face of the lower bracket substantially corresponding to the shape and width of the two or more hydroponic towers, wherein said at least one lower bracket is supported on the rack by said means of support;
wherein the first end of at least two of the two or more hollow hydroponic towers are inserted into two of the at least two upper bracket openings of the upper bracket;
wherein the second end of each of the two or more hollow hydroponic towers are individually inserted into each of the at least two lower bracket openings of the lower bracket;
wherein said hollow hydroponic tower allows organisms to be inserted into said media material through said slot, allowing said organisms to grow out of said media material and through said slot;
and
a means of irrigation operably coupled to said mobile rack.

31. The rack of claim 30, further comprising:
a reservoir, wherein said reservoir is operably coupled to said base; and
wherein said means of irrigation transport water and nutrients from the reservoir to the hydroponic towers.

32. The rack of claim 31, wherein said means of irrigation comprises:
at least one pump;
a conduit capable of transporting water or liquid nutrients from said reservoir,
wherein said conduit is operably coupled to said at least one pump; and
at least one emitter;
wherein said pump transports water or liquid nutrients from said reservoir through the conduit and delivered to said media material through said at least one emitter.

33. The rack of claim 30, further comprising:
said two or more hollow hydroponic towers have a front face, a back face, an open first end, and an open second end; and
the slot having a width equal to only a portion of a width of the front face.

34. The rack of claim 30, further comprising a cross piece, wherein said cross piece traverses the interior chamber of the lower bracket; and wherein said cross piece elevates said hydroponic towers from the lower surface of the lower bracket.

35. The rack of claim 30, wherein said means of support is two or more retaining brackets.

36. The rack of claim 30, wherein said means for moving said rack comprises a plurality of wheels operably coupled to said base, such that said wheels enable said rack to move on a ground surface.

37. The rack of claim 30, wherein said means for moving said rack comprises at least one overhead conveyor operably coupled to said rack, such that said at least one overhead conveyor enables said rack to move horizontally without touching the ground.

38. The rack of claim 30, wherein said means for moving said rack comprises at least one overhead pulley operably coupled to said rack, such that said at least one overhead pulley enables said rack to move horizontally without touching the ground.

39. The rack of claim 30, wherein said media material is made of plastic.

40. The rack of claim 39, wherein said media material is made from a polyethylene plastic.

41. The rack of claim 40, wherein said media material is coated in a silicone binder.

42. The rack of claim 30, wherein said organisms are selected from plants and fungi.

43. The rack of claim 30, wherein said emitter is selected from a drip emitter, sprinkler and micro-spray emitters.

44. The rack of claim 30, further comprising at least one light emitting device, operably coupled to the top brace.

* * * * *